United States Patent
Yun et al.

(10) Patent No.: US 11,333,452 B2
(45) Date of Patent: May 17, 2022

(54) CONFORMAL HEAT EXCHANGER PASSAGE FEATURES FOR IMPROVED FLOW DISTRIBUTION

(71) Applicant: Hamilton Sundstrand Corporation, Charlotte, NC (US)

(72) Inventors: Thomas M. Yun, Glastonbury, CT (US); Vijay Narayan Jagdale, South Windsor, CT (US); Brian St. Rock, Andover, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 217 days.

(21) Appl. No.: 16/715,910

(22) Filed: Dec. 16, 2019

(65) Prior Publication Data

US 2021/0180886 A1    Jun. 17, 2021

(51) Int. Cl.
*F28F 13/12* (2006.01)
*F28F 1/40* (2006.01)

(52) U.S. Cl.
CPC .............. *F28F 13/12* (2013.01); *F28F 1/40* (2013.01)

(58) Field of Classification Search
CPC .... F28F 13/12; F28F 1/40; F28F 3/005; F28F 3/10; F28D 7/00; F28D 9/00
USPC .............................. 165/109.1, 164, 165, 172
See application file for complete search history.

(56) References Cited

U.S. PATENT DOCUMENTS

| | | | |
|---|---|---|---|
| 3,426,841 A * | 2/1969 | Johnson | F28F 9/22 165/178 |
| 3,818,984 A | 6/1974 | Nakamura et al. | |
| 4,883,117 A * | 11/1989 | Dobbs | F28D 7/0033 165/164 |
| 5,273,106 A * | 12/1993 | Drake | F28D 9/0012 165/164 |
| 8,387,362 B2 * | 3/2013 | Storage | F28F 1/022 60/266 |
| 10,378,359 B2 | 8/2019 | Golan et al. | |
| 10,954,858 B2 * | 3/2021 | Army, Jr. | F02C 7/185 |
| 2012/0216544 A1 * | 8/2012 | Eleftheriou | F02C 7/143 60/772 |

(Continued)

FOREIGN PATENT DOCUMENTS

| | | |
|---|---|---|
| EP | 0071781 A1 | 2/1983 |
| EP | 0977000 A1 | 2/2000 |

(Continued)

OTHER PUBLICATIONS

Extended European Search Report for EP Application No. 20214438.2, dated Apr. 28, 2021, pp. 7.

*Primary Examiner* — Justin M Jonaitis
(74) *Attorney, Agent, or Firm* — Kinney & Lange, P. A.

(57) ABSTRACT

A heat exchanger arrangement includes walls defining at least two circuit passages for porting a first fluid, a first of the circuit passages defining a first passage length, and a second of the circuit passages defining a second passage length, the second passage length being different from the first passage length, the walls being in thermal communication with a second fluid while isolating the first fluid from the second fluid, at least one of the first circuit passage and the second circuit passage includes a flow control feature configured to decrease an imbalance in flow between the first circuit passage and the second circuit passage compared to if the flow control feature were not present.

20 Claims, 6 Drawing Sheets

(56) References Cited

U.S. PATENT DOCUMENTS

| | | | |
|---|---|---|---|
| 2016/0108813 A1 | 4/2016 | Schmitz | |
| 2016/0230595 A1* | 8/2016 | Wong | F01D 25/12 |
| 2017/0205149 A1 | 7/2017 | Herring et al. | |
| 2018/0245854 A1* | 8/2018 | Sabo | B33Y 80/00 |
| 2019/0033013 A1 | 1/2019 | Byfield | |
| 2021/0071968 A1* | 3/2021 | Streeter | F28F 9/22 |
| 2021/0102743 A1* | 4/2021 | Elsherbini | F28F 1/128 |

FOREIGN PATENT DOCUMENTS

| | | |
|---|---|---|
| EP | 3508805 A2 | 10/2018 |
| WO | WO2014201311 A1 | 12/2014 |

\* cited by examiner

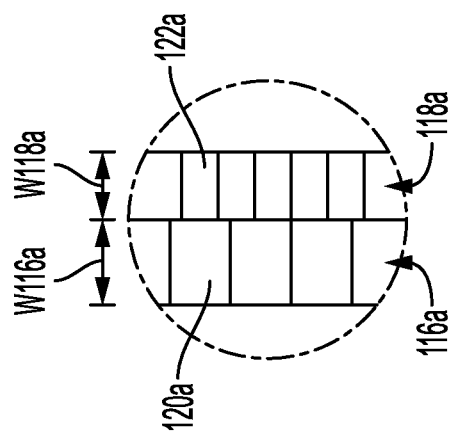
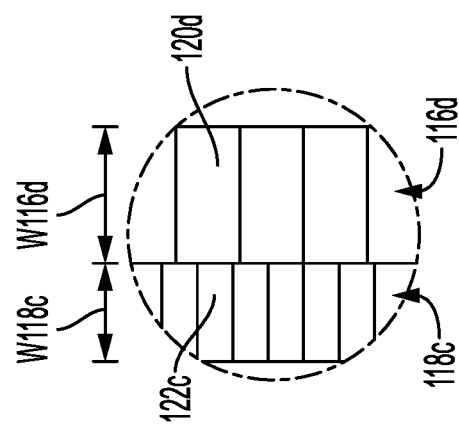
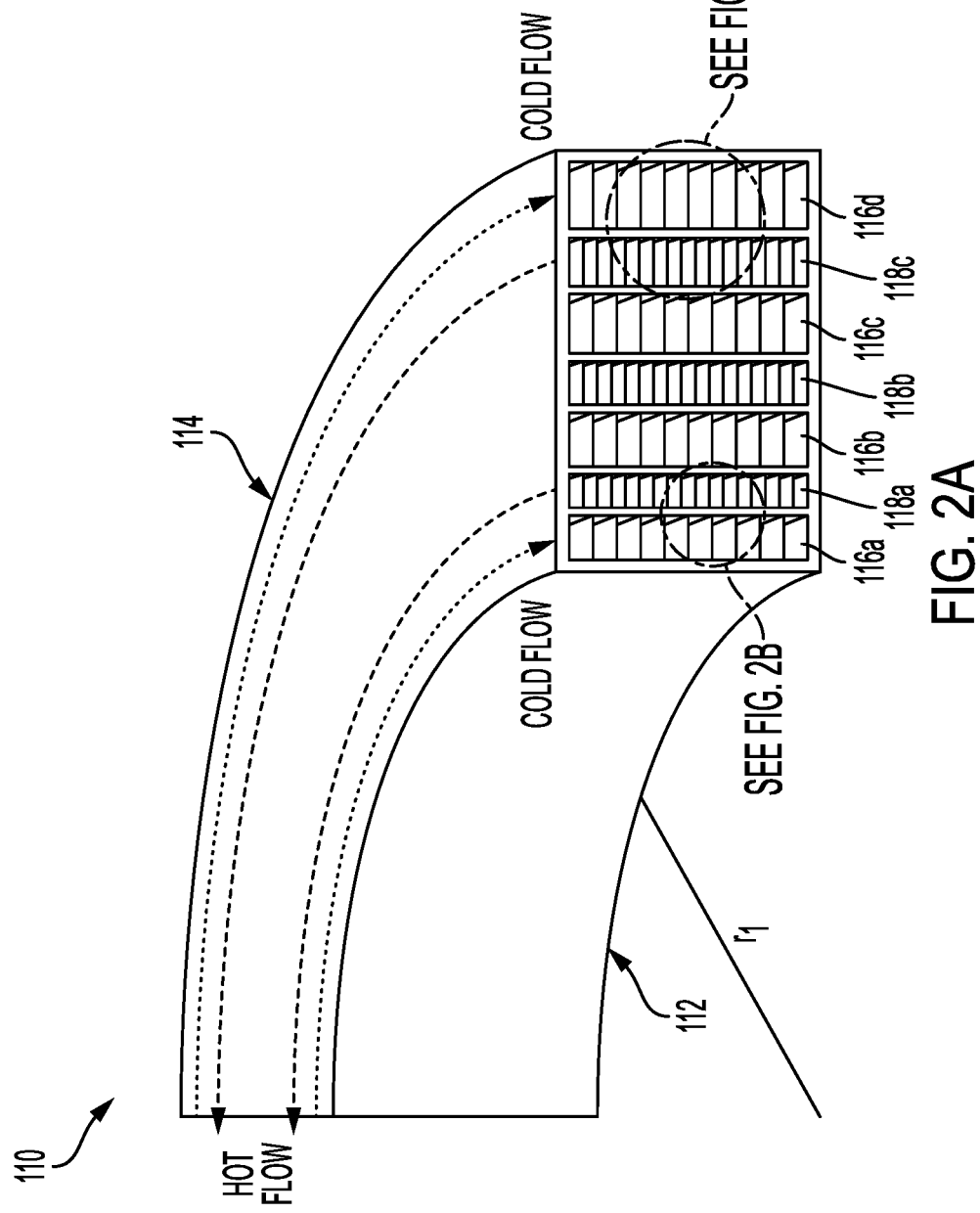

CONFORMAL HEAT EXCHANGER PASSAGE FEATURES FOR IMPROVED FLOW DISTRIBUTION

BACKGROUND

The present disclosure relates to heat exchangers, and more particularly, to a conformal heat exchanger having features for improved flow distribution.

Heat exchangers are well known in the aviation arts and in other industries for providing a compact, low-weight, and highly-effective means of exchanging heat from a hot fluid to a cold fluid. Heat exchangers can be located in tight spaces, such as within the nacelle of a gas turbine engine, where it is desirable to optimize space utilization. Accordingly, a conformal heat exchanger core can have an exterior geometry that conforms to an available installation envelope, thereby helping to optimize space utilization. For example, a conformal heat exchanger core that is located adjacent to a fan duct can have a curved conformal geometry. Although the conformal geometry of a conformal heat exchanger core is beneficial from a perspective of space utilization, the resulting non-uniformity (i.e., variation) in heat exchanger passage geometry can result in flow maldistribution across the heat exchanger core, thereby impacting the thermal and/or hydraulic performance of the conformal heat exchanger as compared to that of a heat exchanger core of uniform geometry. Because of the desire to reduce flow maldistribution across a conformal heat exchanger core, there is a need for balancing the flow through the passages in the conformal heat exchanger to help optimize the thermal and/or hydraulic performance of the conformal heat exchanger.

SUMMARY

A heat exchanger arrangement includes walls defining at least two circuit passages for porting a first fluid, a first of the circuit passages defining a first passage length, and a second of the circuit passages defining a second passage length, the second passage length being different from the first passage length, the walls being in thermal communication with a second fluid while isolating the first fluid from the second fluid, at least one of the first circuit passage and the second circuit passage includes a flow control feature configured to decrease an imbalance in flow between the first circuit passage and the second circuit passage compared to if the flow control feature were not present.

A method of reducing an imbalance in flow impedance throughout a heat exchanger arrangement that includes walls defining at least two circuit passages for porting a first fluid, a first of the circuit passages defining a first passage length, and a second of the circuit passages defining a second passage length, the second passage length being different from the first passage length, the walls being in thermal communication with a second fluid while isolating the first fluid from the second fluid. The method includes providing a flow control feature in at least one of the first circuit passages, the flow control feature configured to decrease an imbalance in flow between the first circuit passage and the second circuit passage compared to if the flow control feature were not present

BRIEF DESCRIPTION OF THE DRAWINGS

FIG. 2A is a perspective end view of a second embodiment of a conformal heat exchanger core with varying passage width.

FIG. 2B is an enlarged view of the conformal heat exchanger core shown in FIG. 2A taken near the inner radius.

FIG. 2C is an enlarged view of the conformal heat exchanger core shown in FIG. 2A taken near the outer radius.

DETAILED DESCRIPTION

Figure 1B:
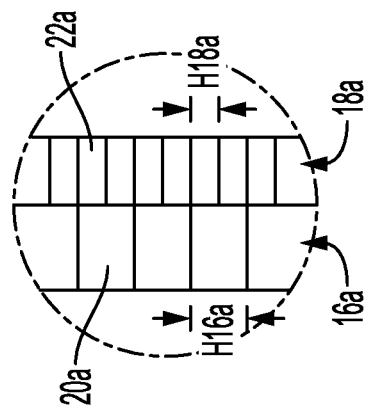
FIG. 1B is an enlarged view of the conformal heat exchanger core shown in FIG. 1A taken near the inner radius.
Figure 1C:
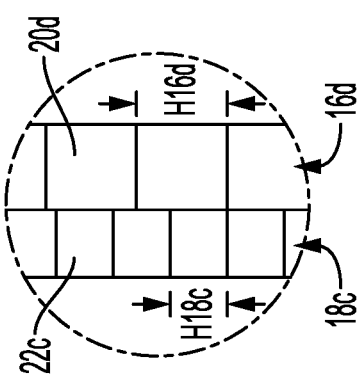
FIG. 1C is an enlarged view of the conformal heat exchanger core shown in FIG. 1A taken near the outer radius.
Figure 1A:
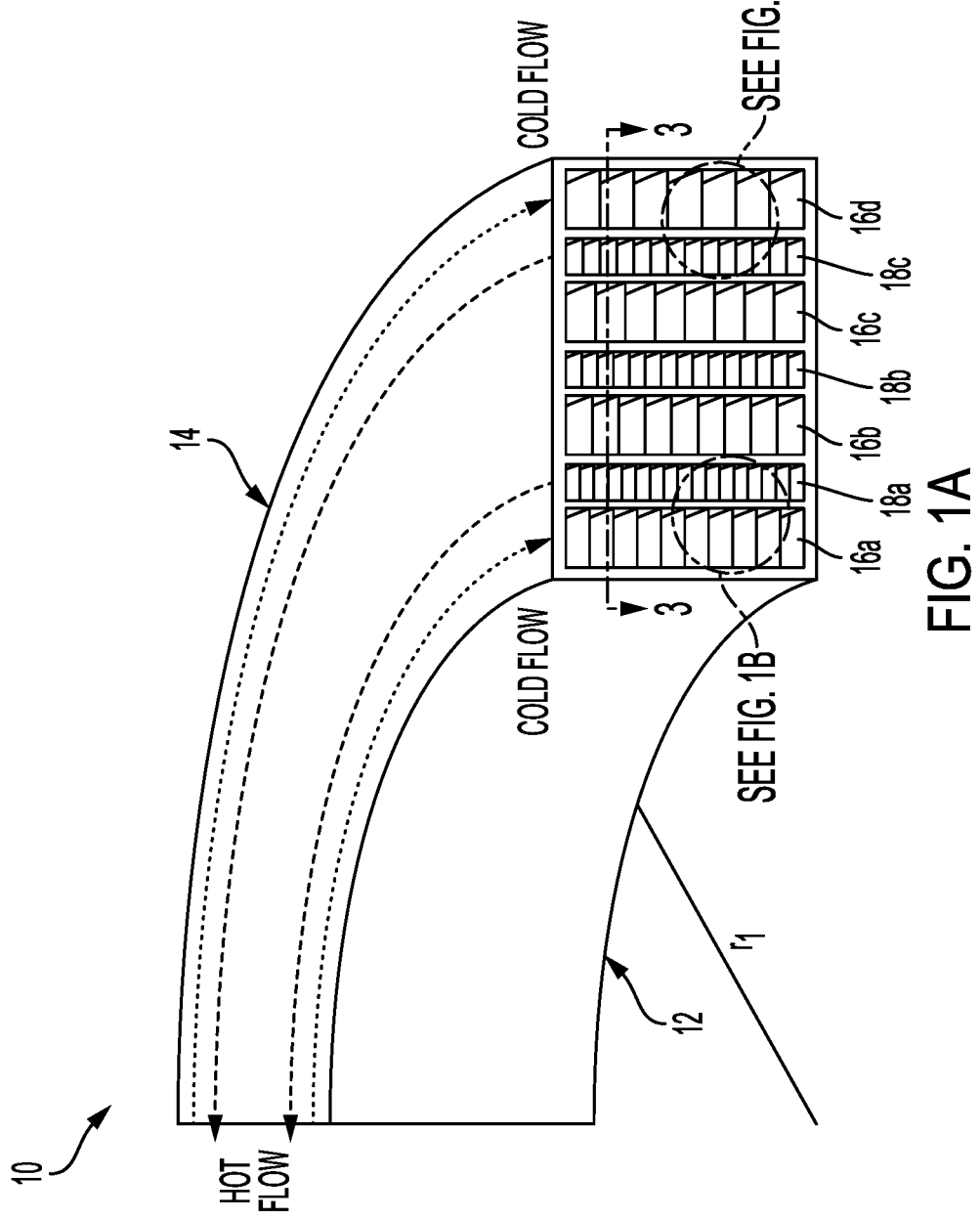
FIG. 1A is a perspective end view of a conformal heat exchanger core with varying passage height.

FIG. 1A is a perspective end view of a conformal heat exchanger core with varying passage height. FIG. 1B is an enlarged view of the conformal heat exchanger core shown in FIG. 1A taken near the inner radius. FIG. 1C is an enlarged view of the conformal heat exchanger core shown in FIG. 1A taken near the outer radius. Shown in FIGS. 1A-1C are conformal core 10, inner radius edge 12, outer radius edge 14, cold layers 16, hot layers 18, cold passages 20, and hot passages 22. Also labeled in FIGS. 1A-1C are passage height H, inner radius r1, and cut line 3-3. Conformal core 10 is an exemplary embodiment of a heat exchanger core that can be located in a curved installation envelope. An exemplary curved installation envelope is outside of and adjacent to a fan duct that is within the nacelle of a gas turbine engine. Inner radius edge 12 defines the inner boundary of conformal core 10, which can conform to an inner curved or circular geometry, with a fan duct being a non-limiting example. The curvature of inner radius edge 12 is defined by inner radius r1. Outer radius edge 14 defines the outer boundary of conformal core 10, which can conform to an outer curved or circular geometry, with a nacelle being a non-limiting example. The curvature of outer radius edge 14 is defined by an outer radius (not labeled in FIG. 1A). Conformal core 10 includes alternating cold layers 16 and hot layers 18. Individual cold layers 16 are numbered 16a, 16b, 16c, and 16d, moving from inner radius edge 12 to outer radius edge 14 as shown in FIG. 1A. Similarly, individual hot layers 18 are numbered 18a, 18b, and 18c, moving from inner radius edge 12 to outer radius edge 14 as shown in FIG. 1A. In the illustrated embodiment, all cold layers 16 have about the same width, being measured along an axis from inner radius edge 12 to outer radius edge 14. Similarly, all hot layers 18 have about the same width, being measured along an axis from inner radius edge 12 to outer radius edge 14. Each cold layer 16 includes a number of cold passages 20, and each hot layer 18 includes a number of hot passages 22. The numbering of cold and hot passages 20, 22 is consistent with the numbering of each respective cold and hot layer 16, 18, as shown in FIG. 1A. For example, cold layer 16a (i.e., being nearest inner radius edge 12) includes a number of cold passages 20a, cold layer 16b includes a number of cold passages 20b, and so on. Individual cold and hot passages 20, 22 have passage height H, as will be described. When configured with as appropriate inlet and outlet manifold (not shown) for the cold layers 16 and hot layers 18, respectively, conformal core 10 can be a conformal heat exchanger that can be used to transfer heat between a cold working fluid flowing through cold layers 16 and a hot working fluid flowing through hot layers 18. The cold and hot working fluids are fluidly isolated from each other, each having a source of pressure that causes fluid flow through the respective cold and hot layers. When operating as a heat exchanger, heat is said to flow from a hot working fluid to a cold working fluid. The cold working fluid can be referred to as a first fluid, and the hot working fluid can be referred to as a second fluid. The fluid phases of the cold and hot fluids are independent of each other, with each being a liquid, a gas, and/or a combination of a liquid and a gas. Moreover, a fluid phase change in the cold and/or hot fluids can occur in conformal core 10. The terms "cold" and "hot" are relative one to the other. As used in different embodiments, conformal core 10 can encounter temperatures ranging from near absolute zero (for example, in cryogenic distillation) to 1,000 deg. F. (538 deg. C.) or more (for example, in gas turbine engine systems and related components). Moreover, "hot" and "cold" are used in this disclosure as descriptive terms to refer to the various components that are associated with the respective first and second fluid circuits in conformal core 10, without implying that particular temperatures or a temperature relationship exists for those components during the manufacturing process of the heat exchanger core.

Referring to FIGS. 1A-1C, the flow length of a particular cold passage 20a (i.e., nearest inner radius edge 12) will be less than the flow length of a particular cold passage 20d (i.e., nearest outer radius edge 14) because of the curved geometry of conformal core 10. It is known in fluid mechanics that the flow impedance (i.e., resistance) of a particular fluid passage is related to the flow length of that particular fluid passage (i.e., passage length). To compensate for the flow impedance mismatch and the resulting flow maldistribution that would otherwise occur, passage height H16a of cold passages 20a in cold layer 16a is less than passage height H16b of cold passages 20b in cold layer 16b. Similarly, passage height H16b of cold passages 20b in cold layer 16b is less than passage height H16c of cold passages 20c in cold layer 16c, and so on. Accordingly, passage height H of cold passages 20 is smallest nearest inner radius edge 12 (i.e., at inner radius r1), and passage height H of cold passages 20 is largest nearest outer radius edge 14. The smaller passage height H in cold passages 20 having the shortest flow length as compared to cold passages 20 having the longest flow length mitigates the flow maldistribution that would otherwise exist across cold layers 16 in conformal core 10. In a similar manner, passage height H18a of hot passages 22a in hot layer 18a is less than passage height H18b of hot passages 22b in hot layer 18b, and so on. In the illustrated embodiment, there is no relationship between passage height H16a, H16b, etc. of cold passages 20 and passage height H18a, H16b, etc. of hot passages 22. Varying passage height H across conformal core 10 can be described as providing impedance matching across conformal core 10. The flow distribution throughout cold layers 16 and hot layers 18 are independent of each other because the cold and hot fluid circuits are fluidly isolated from each other. By mitigating flow maldistribution across cold layers 16 and/or hot layers 18 (i.e., by impedance matching), the thermal and/or hydraulic performance of conformal core 10 is improved, thereby helping optimize the performance of conformal core 10 for a given installation envelope. It is to be appreciated that conformal core 10 is illustrative of a conformal heat exchanger core, with the numbers of cold and hot layers 16, 18 being exemplary. In different embodiments, conformal core 10 can include fewer or more than the illustrated number of cold and hot layers 16, 18. In various embodiments, conformal core can have various geometries that are different than the illustrated embodiment.

FIG. 2A is a perspective end view of a second embodiment of a conformal heat exchanger core with varying passage width. FIG. 2B is an enlarged view of the conformal heat exchanger core shown in FIG. 2A taken near the inner radius. FIG. 2C is an enlarged view of the conformal heat exchanger core shown in FIG. 2A taken near the outer radius. Shown in FIGS. 2A-2C are conformal core 110, inner radius edge 112, outer radius edge 114, cold layers 116, hot layers 118, cold passages 120, and hot passages 122. Also labeled in FIGS. 2A-2C are passage width W and inner radius r1. Conformal core 110 is an exemplary embodiment of a heat exchanger core that can be located in a curved installation envelope, having a description that is substantially similar to that given above in regard to FIGS. 1A-1C. Inner radius edge 112 defines the inner boundary of conformal core 110, with the curvature of inner radius edge 112 is defined by inner radius r1. Outer radius edge 114 defines the outer boundary of conformal core 10, with the curvature of outer radius edge is 14 is defined by an outer radius (not labeled in FIG. 2A). Conformal core 110 includes alternating cold layers 116 and hot layers 118. Individual cold layers 116 are numbered 116a, 116b, 116c, and 116d, moving from inner radius edge 112 to outer radius edge 114 as shown in FIG. 2A. Similarly, individual hot layers 118 are numbered 118a, 118b, and 118c, moving from inner radius edge 112 to outer radius edge 114 as shown in FIG. 2A. Each cold layer 116 includes a number of cold passages 120, and each hot layer 118 includes a number of hot passages 122. The numbering of cold and hot passages 120, 122 is consistent with the numbering of each respective cold and hot layer 116, 118, as shown in FIG. 2A. For example, cold layer 116a (i.e., being nearest inner radius edge 112) includes a number of cold passages 120a, cold layer 116b includes a number of cold passages 120b, and so on. All cold passages 120 have the same height as each other. Similarly, all hot passages 122 have the same height as each other.

The curved geometry of conformal core 110 is similar to that described above in regard to FIGS. 1A-1C. To mitigate flow maldistribution that would otherwise occur, passage width W116a of cold passages 120a in cold layer 116a is less than passage width W116b of cold passages 120b in cold layer 116b. Similarly, passage width W116b of cold passages 120b in cold layer 116b is less than passage width W116c of cold passages 120c in cold layer 116c, and so on. Accordingly, passage width W of cold passages 120 is smallest nearest inner radius edge 112 (i.e., at inner radius r1), and passage width W of cold passages 120 is largest nearest outer radius edge 114. The smaller passage width W in cold passages 120 having the shortest flow length as compared to cold passages 120 having the longest flow length mitigates the flow maldistribution that would otherwise exist across cold layers 116 in conformal core 110. In a similar manner, passage width W118a of hot passages 122a in hot layer 118a is less than passage width W118b of hot passages 122b in hot layer 118b, and so on. The varying of passage width W of conformal core 110 can be described as impedance matching across conformal core 110. In the illustrated embodiment, there is no relationship between passage widths W116a, W116b, etc. of cold passages 120 and passage widths W118a, W116b, etc. of hot passages 122. By mitigating flow maldistribution (i.e., by impedance matching) across cold layers 116 and/or hot layers 118, the thermal and/or hydraulic performance of conformal core 110 is improved, thereby helping optimize the performance of conformal core 110 for a given installation envelope.

Figure 3:
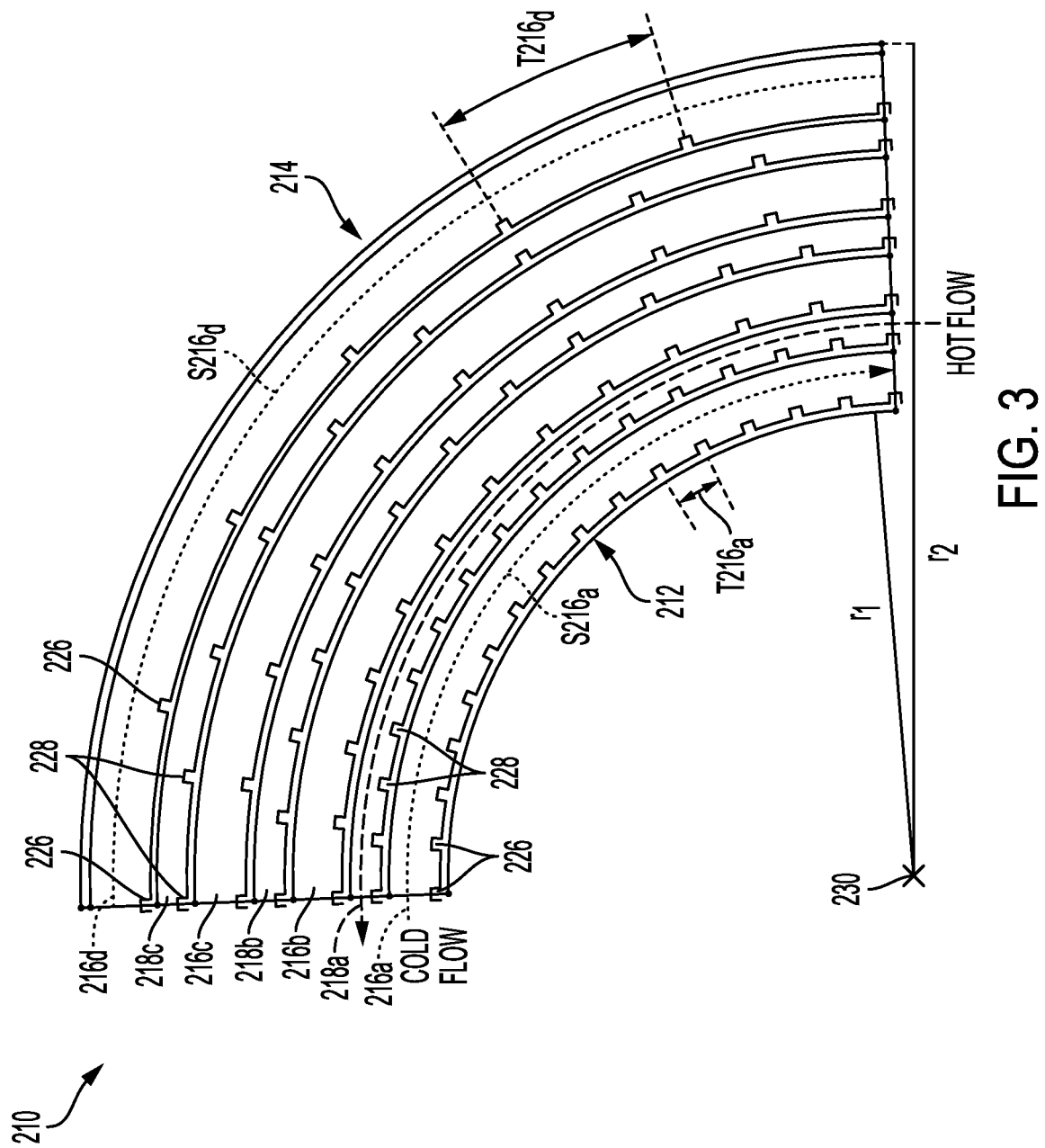
FIG. 3 is a cross-sectional top view of the conformal heat exchanger core shown in FIG. 1A taken at cut line 3-3 in FIG. 1, showing additional flow control features.

FIG. 3 is a cross-sectional top view of conformal core 10 shown in FIG. 1A taken at cut line 3-3 in FIG. 1A, showing additional flow control features. Shown in FIG. 3 are conformal core 210, inner radius edge 212, outer radius edge 214, cold layers 216, hot layers 218, turbulators 226, 228, and geometric center point 230. Also labeled in FIG. 3 are inner radius r1, outer radius r2, passage length S, and turbulator spacing T. The curved geometry of conformal core 210 is readily visible in FIG. 3, with inner radius edge 212 defining inner radius r1 with respect to geometric center point 230, and with outer radius edge 214 defining outer radius r2 with respect to geometric center point 230. Conformal core 210 includes alternating cold layers 216 and hot layers 218, which are configured to provide heat transfer from a hot working fluid to a cold working fluid as was described above in regard to FIGS. 1-1C. Each respective cold layer 216 includes a number of cold passages 220, and each respective hot layer 218 includes a number of hot passages 222. The numbering of cold layers 216a, 216b, 216c, 216d, of cold passages 220a, 220b, 220c, 220d, of hot layers 218a, 218b, 218c, and of hot passages 222a, 222b, 222c is similar to that described above in regard to FIG. 1A. Passage length S defines the mean arc length of a particular cold or hot passage 220, 222. For conformal core 210 having the geometry of a circular arc as shown in FIG. 3, the relationship of a particular passage length S relative to a radius r is readily apparent. Accordingly, passage length S216a (i.e., corresponding to cold layer 216a near inner radius r1) is less than passage length S216d (i.e., corresponding to cold layer 216d near outer radius r2).

For illustration simplicity, FIG. 3 is shown as being taken at cut line 3-3 in FIG. 1A. It is to be noted that FIG. 1A is directed to conformal core 10 having varying passage height H. The following description of FIG. 3 is without regard to passage height H, as described above in regard to FIGS. 1A-1C. Referring to FIG. 3, each cold passage 220 includes a number of turbulators 226 at recurring turbulator spacing T. Turbulators 226 are surface discontinuities along an interior surface (i.e. a wetted surface) of cold passages 220. Turbulators 226 interrupt the flow of the cold working fluid through the respective cold passages 220, thereby causing turbulence while increasing the flow impedance through the respective cold passage. Turbulators 226 can also be referred to as ridges, bumps, riblets, and surface discontinuities. Turbulator spacing T216a defines the distance from one turbulator 226 to the next in cold passage 220a near inner radius r1, and turbulator spacing T216d measures the distance from one turbulator 226 to the next in cold passage 220d near outer radius r2. Similar measurements of turbulator spacing T in other cold passages 220 can be defined (not labeled in FIG. 3). Smaller values of turbulator spacing T (i.e., a greater number of turbulators 226 per unit passage length S) increase the flow impedance through a particular cold passage 220. Accordingly, turbulator spacing T can be configured to balance flow impedance across cold layers 216. The smaller turbulator spacing T in cold passages 220 having the shortest flow length (i.e., in cold layer 216a near inner radius r1) as compared to cold passages 220 having the longest flow length (i.e., in cold layer 216d near outer radius r2) balances flow impedance across cold layers 216, thereby mitigating the flow maldistribution that would otherwise exist across cold layers 216 in conformal core 210. In the illustrated embodiment, turbulator spacing T increases radially through the cold circuit (i.e., cold layers 216) in a direction from inner radius r1 to outer radius r2.

The foregoing description of turbulators 226 in cold layers 216 also applies to turbulators 228 in hot layers 218 (i.e., in hot passages 222). The smaller turbulator spacing T in hot passages 222 having the shortest flow length (i.e., in hot layer 218a near inner radius r1) as compared to hot passages 222 having the longest flow length (i.e., in hot layer 218d near outer radius r2) balances flow impedance across hot layers 218, thereby mitigating the flow maldistribution that would otherwise exist across hot layers 218 in conformal core 210. In the illustrated embodiment, turbulator spacing T increases radially through the hot circuit (i.e., hot layers 218) in a direction from inner radius r1 to outer radius r2. In the illustrated embodiment, there is not a defined relationship between turbulator spacing T for cold layers 216 as compared to turbulator spacing T for hot layers 218, because the cold circuit is fluidly isolated from the hot circuit. In the illustrated embodiment, the location of turbulator 226, 228 is on one side of a particular cold or hot passage 220, 222. In some embodiments, turbulators 226, 228 can be located on an opposite side of a particular cold or hot passage 220, 222 than shown. In other embodiments, turbulators 226, 228 can be located on both sides of a particular cold and/or hot passage 220, 222. In yet other embodiments, one or more cold and/or hot passages 220, 222 can have no turbulators 226, 228.

Referring again to FIG. 3, turbulators 226 are depicted as having an approximately uniform shape and size, with turbulator spacing T being the feature that varies from one cold layer 216 to the next. In various embodiments, other features of turbulators 226 can vary across cold layers 216 that affect flow through affected cold passages 220. Non-limiting examples of flow-affecting features include turbulator height (i.e., measuring the projection of a particular turbulator 226 into a particular cold passage 220) and turbulator shape (e.g., rectangular, triangular). Accordingly, in a particular embodiment, turbulators 226 are configured to create the greatest flow impedance per unit passage length S in cold passages 220 having the smallest passage length S, and the least flow impedance per unit passage length S in cold passages 220 having the largest passage length S, thereby matching flow impedance across cold layers 216. The foregoing description of turbulators 226 in cold layers 216 applies to turbulators 228 in hot layers 218. In a particular embodiment, turbulators 228 are configured to create the greatest flow impedance per unit passage length S in hot passages 222 having the smallest passage length S, and the least flow impedance per unit passage length S in hot passages 222 having the largest passage length S, thereby matching flow impedance across hot layers 218. In this way, flow maldistribution in both the cold circuit and the hot circuit of conformal core 210 can be mitigated, thereby optimizing thermal and/or hydraulic performance of conformal core 210 for a given installation envelope.

Figure 4:
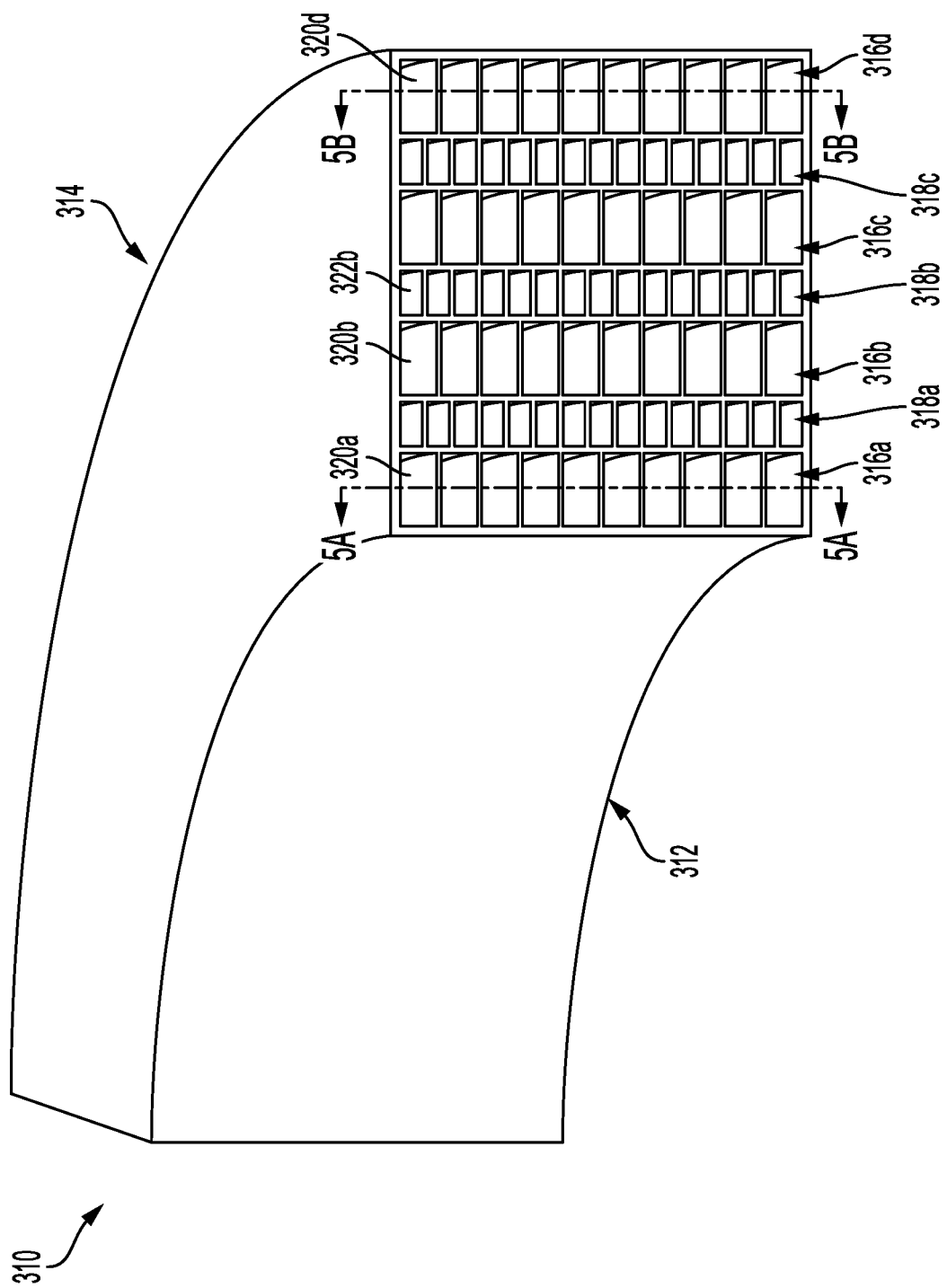
FIG. 4 is a perspective end view of a third embodiment of a conformal heat exchanger core with varying fin wavelength and fin amplitude.
Figures 5A, 5B:
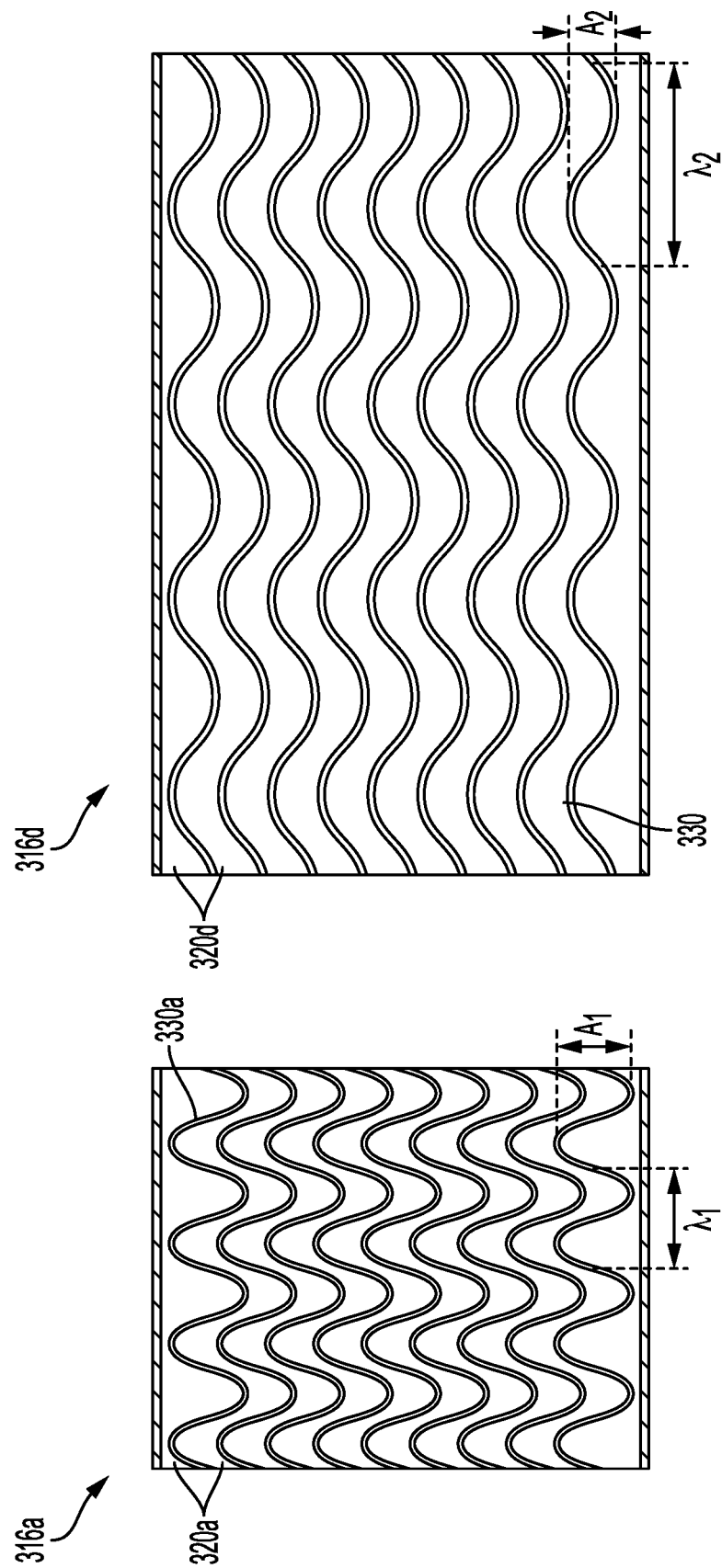
FIG. 5A is a cross-sectional radial side view of an inner radius flow passage of the conformal heat exchanger core shown in FIG. 4 taken at cut line 5A-5A in FIG. 4.
FIG. 5B is a cross-sectional radial side view of an outer radius flow passage of the conformal heat exchanger core shown in FIG. 4 taken at cut line 5B-5B in FIG. 4.

FIG. 4 is a perspective end view of a third embodiment of a conformal heat exchanger core with varying fin wavelength and fin amplitude. FIG. 5A is a cross-sectional radial side view of an inner radius flow passage of the conformal heat exchanger core shown in FIG. 4 taken at cut line 5A-5A in FIG. 4. FIG. 5B is a cross-sectional radial side view of an outer radius flow passage of the conformal heat exchanger core shown in FIG. 4 taken at cut line 5B-5B in FIG. 4. Shown in FIG. 4 are conformal core 310, inner radius edge 312, outer radius edge 314, cold layers 316, hot layers 318, cold passages 320, and hot passages 322. Shown in FIGS. 5A-5B are cold layer 316, cold passages 320, and fins 330. Also labeled in FIGS. 5A-5B are fin wavelength λ, and fin amplitude A.

Conformal core 310 is an exemplary embodiment of a heat exchanger core that can be located in a curved installation envelope, having a description that is substantially similar to that given above in regard to FIGS. 1A-1C. Inner radius edge 312 defines the inner boundary of conformal core 310 associated with the inner radius (not labeled in FIG. 4), and outer radius edge 314 defines the outer boundary of conformal core 310 associated with the outer radius (not labeled in FIG. 4). The descriptions of the inner and outer radii (not labeled in FIG. 4) are similar to those provided above in regard to FIG. 3. Conformal core 310 includes alternating cold layers 316 and hot layers 318. Individual cold layers 316 are numbered 316a, 316b, 316c, and 316d, moving from inner radius edge 312 to outer radius edge 314 as shown in FIG. 4. Similarly, individual hot layers 318 are numbered 318a, 318b, and 318c, moving from inner radius edge 312 to outer radius edge 314 as shown in FIG. 4. Each cold layer 316 includes a number of cold passages 320, and each hot layer 318 includes a number of hot passages 322. The numbering of cold and hot passages 320, 322 is consistent with the numbering of each respective cold and hot layer 316, 318, as shown in FIG. 4. In the illustrated embodiment, the widths (not labeled in FIG. 4) of all cold layers 316 are about the same, and the heights (not labeled in FIG. 4) of all cold passages 320 are about the same. Instead, flow impedance is matched across cold layers 316 by varying the configuration of fins 330, as shown in FIGS. 5A-5B. Cold fins 330a are located in cold layer 316a, located near inner radius edge 312. Any two adjacent cold fins 330a define a particular cold passage 320a near inner radius edge 312. Cold fins 330a are sinuous (i.e., having a sinusoidal shape) and are characterized as having fin wavelength λ1 and fin amplitude A1. Similarly, cold fins 330d near outer radius edge 314 define cold passages 320d and are characterized as having wavelength λ2 and fin amplitude A2. In the illustrated embodiment, fin wavelength λ1 near inner radius edge 312 is less than fin wavelength λ2 near outer radius edge 314. Fin wavelength λ in cold layers 316b and 316c (not shown in FIGS. 5A-5B) are intermediate values between fin wavelengths λ1 and λ2, such that fin wavelength λ increases radially through the cold circuit (i.e., cold layers 316) in a direction from the inner radius to the outer radius. Cold fins 330 can also be referred to as wavy fins.

In the illustrated embodiment, fin amplitude A1 near inner radius edge 312 is greater than fin amplitude A2 near outer radius edge 314. Fin amplitude A in cold layers 316b and 316c (not shown in FIGS. 5A-5B) are intermediate values between fin amplitudes A1 and A2, such that fin amplitude A decreases radially through the cold circuit (i.e., cold layers 316) in a direction from the inner radius to the outer radius. The cold working fluid flowing through cold passages 316 must follow a sinuous path defined by fin 330, continuously changing direction while flowing through cold passages 320. The shorter fin wavelength λ1 in cold layer 316a as compared to fin wavelength λ2 in cold layer 316d causes more frequent flow reversal per unit passage length, thereby resulting in greater flow impedance per unit passage length. Similarly, the greater fin amplitude A1 in cold layer 316a as compared to fin amplitude A2 in cold layer 316d causes a more dynamic flow reversal per unit passage length, thereby resulting in greater flow impedance per unit passage length. By varying fin wavelength λ and fin amplitude A across cold layers 316, flow impedance is matched across cold layers 316, thereby mitigating flow maldistribution in the cold circuit. The illustrated embodiment shows a variation in both fin wavelength λ and fin amplitude A across cold layers 316. In some embodiments, only one parameter (i.e., fin wavelength λ or fin amplitude A) can vary.

The foregoing description of fins 330 in cold layers 316 can also be applied to the hot fins (not shown) in hot layers 318. For example, fin wavelength λ can vary across hot layers 318, such that a shorter value of fin wavelength λ is in hot layer 318a near the inner radius, and a longer value of fin wavelength λ is in hot layer 318c near the outer radius. Similarly, fin amplitude A vary across hot layers 318, such that a larger value of fin amplitude A is in hot layer 318a near the inner radius, and a smaller value of fin amplitude A is in hot layer 318c near the outer radius. By configuring the variation of fin wavelength λ and/or fin amplitude A across hot layers 318, flow impedance is matched across hot layers 318, thereby mitigating flow maldistribution in the hot circuit. Accordingly, the distribution of fin wavelength λ and/or fin amplitude A in cold layers 316 and/or hot layers 318 can optimizing the thermal and/or hydraulic performance of conformal core 310 for a given installation envelope.

The various embodiments shown and described above in regard to FIGS. 1A-1C, 2A-2C, 3-4, and 5A-5B are based on a conformal heat exchanger core having a geometry that surrounds a circular shape (e.g., a fan duct). FIGS. 1A, 2A, and 3-4 depict an approximately quarter-circular arc of a right circular cylinder for simplicity in illustrating the various impedance-matching features. All conformal heat exchanger core geometries are within the scope of the present disclosure. For example, a particular conformal heat exchanger core can be either more than or less than a quarter-circular arc. The shape of a component the conformal heat exchanger core accommodates can be different than circular, with non-limiting examples including oval, elliptical, square, rectangular, triangular, and the like. Moreover, the height of the conformal heat exchanger core (i.e., in a direction orthogonal to the inner and outer radius) can vary with the radius. In other words, the end view of conformal core 10 depicted in FIG. 1A can be a non-rectangular shape. Non-limiting examples of non-rectangular shapes include trapezoidal, oval, and round shapes. For example, a conformal heat exchanger core having a toroidal shape will present a round cross-sectional end view.

The various embodiments shown and described above in regard to FIGS. 1A-1C, 2A-2C, 3-4, and 5A-5B depict various means of matching flow impedance in cold and hot circuits in a conformal heat exchanger core that has a variation in passage length across the core. Various passage features (i.e., flow control passage features) were disclosed, each contributing to impedance matching, thereby mitigating flow maldistribution in a conformal heat exchanger core.

In various embodiments, any combination of the aforementioned passage features can be used to provide flow impedance matching. Moreover, passage features in some passages and/or some layers can be different from those passage features in other passages and/or layers. These flow control passage features can also be referred to as flow control features, impedance-matching features, flow maldistribution mitigation features, and flow distribution improvement features. The list of impedance-matching features shown in FIGS. 1A-1C, 2A-2C, 3-4, and 5A-5B is non-limiting, and all other impedance-matching features are within the scope of the present disclosure. Additional examples of impedance-matching features are further disclosed, as follows.

Figure 6A:
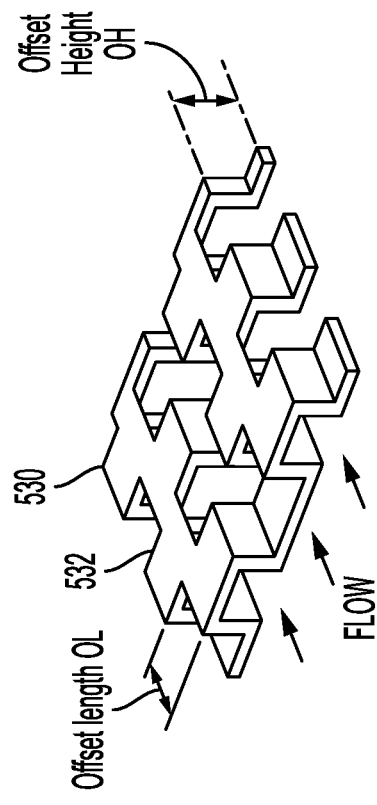
FIG. 6A is a perspective view showing fin geometry for straight fins.

FIG. 6A is a perspective view showing fin geometry for straight fins. Shown in FIG. 6A are straight fins 430. Also labeled in FIG. 6A are fin height FH and fin pitch FP. In an embodiment using straight fins 430, fin height FH and/or fin pitch FP can be varied throughout a conformal heat exchanger core to provide impedance matching, thereby mitigating flow maldistribution throughout the conformal heat exchanger core.

Figure 6B:
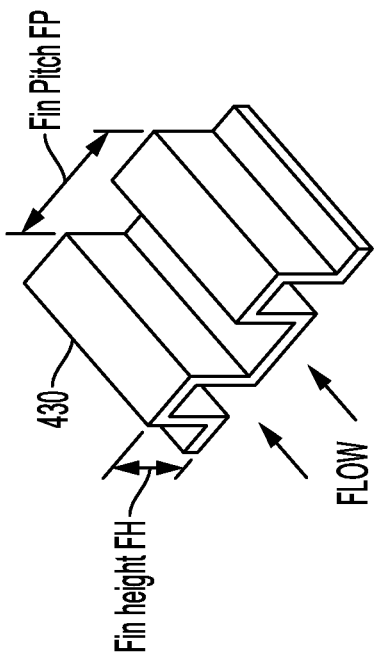
FIG. 6B is a perspective view showing fin geometry for strip fins.

FIG. 6B is a perspective view showing fin geometry for strip fins. Shown in FIG. 6B are strip fins 530. Also labeled in FIG. 6A are offset length OL and offset height OH. In an embodiment using strip fins 530, offset length OL and/or offset height OH can be varied throughout a conformal heat exchanger core to provide impedance matching, thereby mitigating flow maldistribution throughout the conformal heat exchanger core.

Figure 6C:
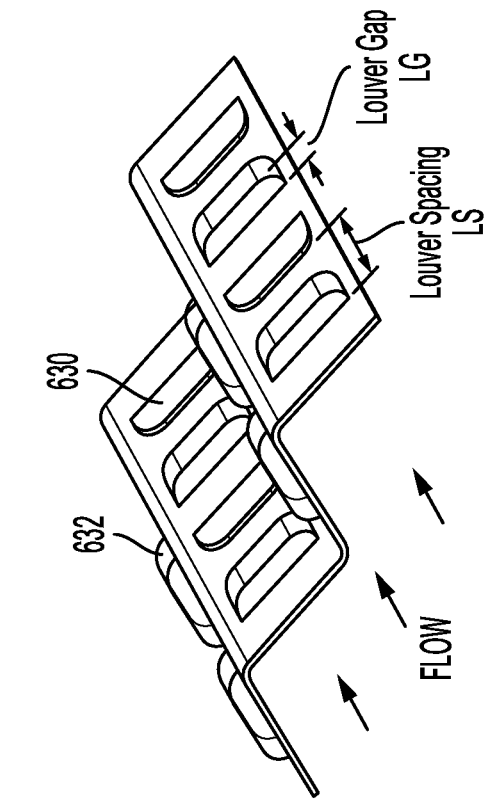
FIG. 6C is a perspective view showing fin geometry for louvered fins.

FIG. 6C is a perspective view showing fin geometry for louvered fins. Shown in FIG. 6C are louvered fins 630 and louvers 632. Also labeled in FIG. 6C are louver spacing LS and louver gap LG. In an embodiment using louvered fins 630, louver spacing LS and/or louver gap LG can be varied throughout a conformal heat exchanger core to provide impedance matching, thereby mitigating flow maldistribution throughout the conformal heat exchanger core.

Figure 6D:
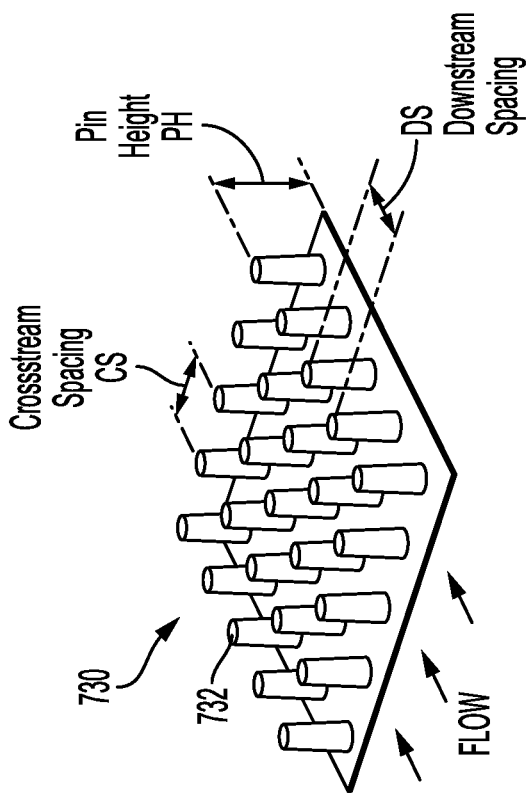
FIG. 6D is a perspective view showing fin geometry for pin fins.

FIG. 6D is a perspective view showing fin geometry for pin fins. Shown in FIG. 6D are pin fins 730 and pins 732. Also labeled in FIG. 6D are cross-stream spacing CS, downstream spacing DS, and pin height PH. Smaller values of cross-stream spacing CS and/or downstream spacing DS provide a greater value of pin density, with a larger value of pin density generally providing greater flow impedance. Larger values of pin height PH also generally provide greater flow impedance. In an embodiment using pin fins 730, pin density (i.e., cross-stream spacing CS and/or downstream spacing DS) and/or pin height PH can be varied throughout a conformal heat exchanger core to provide impedance matching, thereby mitigating flow maldistribution throughout the conformal heat exchanger core.

In describing the various flow control features in FIGS. 1A-1C, 2A-2C, 3-4, 5A-5B, and 6A-6D, reference was made to various passages by comparing a passage near an inner radius to a passage further from the inner radius (i.e., closer to the outer radius). The various passages can also be referred to as circuits. Accordingly, a comparison can be made between a first circuit passage and a second circuit passage, whereby both circuits port the same working fluid (i.e., the first or second fluid).

The various embodiments shown and described in the present disclosure are directed to various structures that can be used to provide impedance-matching in conformal core 10, 110, 210, 310. Accordingly, methods of providing impedance-matching can be achieved by utilizing the foregoing structures. All means of fabricating conformal core 10, 110, 210, 310 to provide various impedance-matching features are within the scope of the present disclosure, with non-limiting examples including brazing, welding, extrusion, casting, machining, subtractive, additive, hybrid-additive, and additive-subtractive manufacturing processes. In some embodiments, the various impedance-matching features of the present disclosure can be suitable to an additive manufacturing process. Moreover, an additive manufacturing process can lend itself to the manufacturing of a conformal heat exchanger core in some embodiments. Accordingly, conformal core 10, 110, 210, 310 can be made from a material that is suitable for a particular application and/or a particular manufacturing process. In various embodiments, conformal core 10, 110, 210, 310 can be made of aluminum, copper, nickel, titanium, iron, cobalt, or any alloy of one or more of these metals. In other embodiments, conformal core 10, 110, 210, 310 can be made of any metal and/or non-metal. Exemplary non-metals include polymers (e.g., polypropylene, polyethylene, polyphenylene sulfide (PPS), and polytetrafluoroethylene (PTFE)). In yet other embodiments, conformal core 10, 110, 210, 310 can be made of polymer composites, for example, any of the aforementioned polymers filled with graphite, metallic particles, carbon fibers, and/or carbon nanotubes. Laser powder bed fusion (LPBF) is a non-limiting exemplary additive-manufacturing process that can be used to manufacture conformal core 10, 110, 210, 310. In some embodiments of a LPBF additive manufacturing process, various alloys of INCONEL™ can be used, with Inconel 625 and Inconel 718 being two exemplary alloy formulations. In other embodiments, other nickel-based superalloys can be used, with Haynes 282™ being an example. In yet other embodiments, alloys of aluminum can be used. For example, alloys of aluminum known as A205, A20X™ AlSi10Mg, and Aluminum 6061 can be used.

Discussion of Possible Embodiments

The following are non-exclusive descriptions of possible embodiments of the present invention.

A heat exchanger arrangement comprising: walls defining at least two circuit passages for porting a first fluid, a first of the circuit passages defining a first passage length, and a second of the circuit passages defining a second passage length, the second passage length being different from the first passage length, the walls being in thermal communication with a second fluid while isolating the first fluid from the second fluid, at least one of the first circuit passage and the second circuit passage includes a flow control feature configured to decrease an imbalance in flow between the first circuit passage and the second circuit passage compared to if the flow control feature were not present.

The heat exchanger arrangement of the preceding paragraph can optionally include, additionally and/or alternatively, any one or more of the following features, configurations and/or additional components:

A further embodiment of the foregoing heat exchanger arrangement, wherein at least the first circuit passage and the second circuit passage are configured in a curved geometry defining an inner radius and an outer radius, the inner radius being smaller than the outer radius.

A further embodiment of the foregoing heat exchanger arrangement, wherein: the first circuit passage is disposed in a region of the heat exchanger arrangement proximate the inner radius; and the flow control feature is included in the first circuit passage.

A further embodiment of the foregoing heat exchanger arrangement, wherein the flow control feature is a difference in fin spacing, wherein: the fin spacing in the first circuit passage is less than the fin spacing in the second circuit passage; and the fin spacing in the first circuit passage is configured to restrict flow therethrough, thereby increasing a flow impedance in the first circuit passage.

A further embodiment of the foregoing heat exchanger arrangement, wherein the flow control feature is a difference in fin height, wherein: the fin height in the first circuit passage is less than the fin height in the second circuit passage; and the fin height in the first circuit passage is configured to restrict flow therethrough, thereby increasing a flow impedance in the first circuit passage.

A further embodiment of the foregoing heat exchanger arrangement, wherein: the first and second circuit passages each further comprises two or more turbulators; two adjacent turbulators in the first circuit passage defining a respective first circuit passage turbulator spacing density; two adjacent turbulators in the second circuit passage defining a respective second circuit passage turbulator spacing density; the flow control feature is a difference between first circuit passage turbulator spacing density and the second circuit passage turbulator spacing density; the first circuit turbulator spacing density is greater than the second circuit turbulator spacing density; and the first circuit turbulator spacing is configured to restrict flow therethrough, thereby increasing the flow impedance in the first circuit passage.

A further embodiment of the foregoing heat exchanger arrangement, wherein: the first and second circuit passages each further comprises wavy fins; the wavy fins define wavy fin characteristics of fin amplitude and fin wavelength; the flow control feature is a difference fin amplitude; and the fin amplitude in the first circuit passage is greater than the fin amplitude in the second circuit passage.

A further embodiment of the foregoing heat exchanger arrangement, wherein: the first and second circuit passages each further comprises wavy fins; the wavy fins define wavy fin characteristics of fin amplitude and fin wavelength; the flow control feature is a difference fin wavelength; and the fin wavelength in the first circuit passage is less than the fin wavelength in the second circuit passage.

A further embodiment of the foregoing heat exchanger arrangement, wherein: the flow control feature is a variation in a fin feature; the variation in the fin feature is selected from the group consisting of: straight fins, strip fins, louvered fins, and pin fins; and the variation in the fin feature is configured to restrict a flow through the first circuit passage as compared to the fin feature in the second circuit passage, thereby increasing the flow impedance of the first circuit passage.

A further embodiment of the foregoing heat exchanger arrangement, wherein: the first and second circuit passages each define a cross-sectional flow area; the flow control feature is a difference in the cross-sectional flow area; the cross-sectional flow area in the first circuit passage is smaller than the cross-sectional flow area in the second circuit passage; and the smaller cross-sectional flow area in the first circuit passage is configured to restrict flow therethrough, thereby increasing the flow impedance in the first circuit passage.

A further embodiment of the foregoing heat exchanger arrangement, further comprising two or more second fluid passages for porting the second fluid, defining at least a second fluid first circuit passage and a second fluid second circuit passage, wherein: the second fluid first circuit passage defines a second circuit first passage length; the second fluid second circuit passage defines a second circuit second passage length, the second circuit second passage length being greater than the second fluid first circuit passage; and at least the second fluid first circuit passage includes a second fluid flow control feature configured to decrease an imbalance in flow between the second fluid first circuit passage and the second fluid second circuit passage compared to if the second fluid flow control feature were not present.

A further embodiment of the foregoing heat exchanger arrangement, comprising a material selected from the group consisting of nickel, aluminum, titanium, copper, iron, cobalt, or alloys thereof.

A further embodiment of the foregoing heat exchanger arrangement, comprising one or more polymers selected from the group consisting of polypropylene, polyethylene, polyphenylene sulfide (PPS), and polytetrafluoroethylene (PTFE).

A further embodiment of the foregoing heat exchanger arrangement, wherein the heat exchanger arrangement is made using an additive manufacturing process.

A further embodiment of the foregoing heat exchanger arrangement, wherein: the heat exchanger arrangement is a conformal heat exchanger core; and the conformal heat exchanger core is configured to conform to an outer portion of a circular shape.

A method of reducing an imbalance in flow impedance throughout a heat exchanger arrangement comprising walls defining at least two circuit passages for porting a first fluid, a first of the circuit passages defining a first passage length, and a second of the circuit passages defining a second passage length, the second passage length being different from the first passage length, the walls being in thermal communication with a second fluid while isolating the first fluid from the second fluid, the method comprising: including a flow control feature in at least one of the first circuit passages, the flow control feature configured to decrease an imbalance in flow between the first circuit passage and the second circuit passage compared to if the flow control feature were not present.

The method of the preceding paragraph can optionally include, additionally and/or alternatively, any one or more of the following features, configurations and/or additional components:

A further embodiment of the foregoing method, wherein: at least the first circuit passage and the second circuit passage are configured in a curved geometry defining an inner radius and an outer radius, the inner radius being smaller than the outer radius; the first circuit passage is disposed in a region of the heat exchanger arrangement proximate the inner radius; and the flow control feature is included in the first circuit passage.

A further embodiment of the foregoing method, wherein the flow control feature comprises one or more of: a difference in fin spacing, wherein: the fin spacing in the first circuit passage is less than the fin spacing in the second circuit passage; and the fin spacing in the first circuit passage is configured to restrict flow therethrough, thereby increasing the flow impedance thereof; and a difference in fin height, wherein: the fin height in the first circuit passage is less than the fin height in the second circuit passage; and the fin height in the first circuit passage is configured to restrict flow therethrough, thereby increasing the flow impedance thereof.

A further embodiment of the foregoing method, wherein: the first and second circuit passages each further comprises two or more turbulators; two adjacent turbulators in the first circuit passage defining a respective first circuit passage turbulator spacing density; two adjacent turbulators in the second circuit passage defining a respective second circuit passage turbulator spacing density; the flow control feature is a difference between first circuit passage turbulator spacing density and the second circuit passage turbulator spacing density; the first circuit turbulator spacing density is greater than the second circuit turbulator spacing density; and the first circuit turbulator spacing is configured to restrict flow therethrough, thereby increasing the flow impedance in the first circuit passage.

A further embodiment of the foregoing method, wherein: the first and second circuit passages each further comprise wavy fins; the wavy fins define wavy fin characteristics of fin amplitude and fin wavelength; and the flow control feature comprises one or more of: a difference in fin amplitude, wherein the fin amplitude in the first circuit passage is greater than the fin amplitude in the second circuit passage; and a difference in fin wavelength, wherein the fin wavelength in the first circuit passage is less than the fin wavelength in the second circuit passage.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A heat exchanger arrangement comprising:
   walls defining at least two circuit passages for porting a first fluid, a first of the circuit passages defining a first passage length, and a second of the circuit passages defining a second passage length, the second passage length being different from the first passage length, wherein the first of the circuit passages is directly adjacent to the second of the circuit passages;
   wherein the walls are being in thermal communication with a second fluid while isolating the first fluid from the second fluid, such that the first fluid and the second fluid flow in the same direction; and
   wherein at least one of the first circuit passage and the second circuit passage includes a flow control feature configured to decrease an imbalance in flow between the first circuit passage and the second circuit passage.

2. The heat exchanger arrangement of claim 1, wherein at least the first circuit passage and the second circuit passage are configured in a curved geometry defining an inner radius and an outer radius, the inner radius being smaller than the outer radius.

3. The heat exchanger arrangement of claim 2, wherein: the first circuit passage is disposed in a region of the heat exchanger arrangement proximate the inner radius; and the flow control feature is included in the first circuit passage.

4. The heat exchanger arrangement of claim 3, wherein the flow control feature is a difference in fin spacing, wherein:
   the fin spacing in the first circuit passage is less than the fin spacing in the second circuit passage; and
   the fin spacing in the first circuit passage is configured to restrict flow therethrough, thereby increasing a flow impedance in the first circuit passage.

5. The heat exchanger arrangement of claim 3, wherein the flow control feature is a difference in fin height, wherein:
   the fin height in the first circuit passage is less than the fin height in the second circuit passage; and
   the fin height in the first circuit passage is configured to restrict flow therethrough, thereby increasing a flow impedance in the first circuit passage.

6. The heat exchanger arrangement of claim 3, wherein:
   the first and second circuit passages each further comprises two or more turbulators;
   two adjacent turbulators in the first circuit passage defining a respective first circuit passage turbulator spacing density;
   two adjacent turbulators in the second circuit passage defining a respective second circuit passage turbulator spacing density;
   the flow control feature is a difference between first circuit passage turbulator spacing density and the second circuit passage turbulator spacing density;
   the first circuit turbulator spacing density is greater than the second circuit turbulator spacing density; and
   the first circuit turbulator spacing is configured to restrict flow therethrough, thereby increasing the flow impedance in the first circuit passage.

7. The heat exchanger arrangement of claim 3, wherein:
   the first and second circuit passages each further comprises wavy fins;
   the wavy fins define wavy fin characteristics of fin amplitude and fin wavelength;
   the flow control feature is a difference fin amplitude; and
   the fin amplitude in the first circuit passage is greater than the fin amplitude in the second circuit passage.

8. The heat exchanger arrangement of claim 3, wherein:
   the first and second circuit passages each further comprises wavy fins;
   the wavy fins define wavy fin characteristics of fin amplitude and fin wavelength;
   the flow control feature is a difference fin wavelength; and
   the fin wavelength in the first circuit passage is less than the fin wavelength in the second circuit passage.

9. The heat exchanger arrangement of claim 3, wherein:
   the flow control feature is a variation in a fin feature;
   the variation in the fin feature is selected from the group consisting of: straight fins, strip fins, louvered fins, and pin fins; and
   the variation in the fin feature is configured to restrict a flow through the first circuit passage as compared to the fin feature in the second circuit passage, thereby increasing the flow impedance of the first circuit passage.

10. The heat exchanger arrangement of claim 3, wherein:
    the first and second circuit passages each define a cross-sectional flow area;
    the flow control feature is a difference in the cross-sectional flow area;
    the cross-sectional flow area in the first circuit passage is smaller than the cross-sectional flow area in the second circuit passage; and
    the smaller cross-sectional flow area in the first circuit passage is configured to restrict flow therethrough, thereby increasing the flow impedance in the first circuit passage.

11. The heat exchanger arrangement of claim 1, further comprising two or more second fluid passages for porting the second fluid, defining at least a second fluid first circuit passage and a second fluid second circuit passage, wherein:
    the second fluid first circuit passage defines a second circuit first passage length;

the second fluid second circuit passage defines a second circuit second passage length, the second circuit second passage length being greater than the second fluid first circuit passage; and at least the second fluid first circuit passage includes a second fluid flow control feature configured to decrease an imbalance in flow between the second fluid first circuit passage and the second fluid second circuit passage compared to if the second fluid flow control feature were not present.

12. The heat exchanger arrangement of claim 1, comprising a material selected from the group consisting of nickel, aluminum, titanium, copper, iron, cobalt, or alloys thereof.

13. The heat exchanger arrangement of claim 1, comprising one or more polymers selected from the group consisting of polypropylene, polyethylene, polyphenylene sulfide (PPS), and polytetrafluoroethylene (PTFE).

14. The heat exchanger arrangement of claim 1, wherein the heat exchanger arrangement is made using an additive manufacturing process.

15. The heat exchanger arrangement of claim 1, wherein:
the heat exchanger arrangement is a conformal heat exchanger core; and
the conformal heat exchanger core is configured to conform to an outer portion of a circular shape.

16. A method of reducing an imbalance in flow impedance throughout a heat exchanger arrangement comprising walls defining at least two circuit passages for porting a first fluid, a first of the circuit passages defining a first passage length, and a second of the circuit passages defining a second passage length, the second passage length being different from the first passage length, the first of the circuit passages being directly adjacent to the second of the circuit passages, the walls being in thermal communication with a second fluid while isolating the first fluid from the second fluid, the method comprising:
flowing the first fluid and the second fluid in a first direction through the heat exchanger; and
decreasing an imbalance in flow between the first circuit passage and the second circuit passage by flowing the first fluid adjacent a flow control feature within at least one of the first circuit passages, compared to if the flow control feature were not present.

17. The method of claim 16, wherein:
at least the first circuit passage and the second circuit passage are configured in a curved geometry defining an inner radius and an outer radius, the inner radius being smaller than the outer radius;
the first circuit passage is disposed in a region of the heat exchanger arrangement proximate the inner radius; and
the flow control feature is included in the first circuit passage.

18. The method of claim 16, wherein the flow control feature comprises one or more of:
a difference in fin spacing, wherein:
the fin spacing in the first circuit passage is less than the fin spacing in the second circuit passage; and
the fin spacing in the first circuit passage is configured to restrict flow therethrough, thereby increasing the flow impedance thereof; and
a difference in fin height, wherein:
the fin height in the first circuit passage is less than the fin height in the second circuit passage; and
the fin height in the first circuit passage is configured to restrict flow therethrough, thereby increasing the flow impedance thereof.

19. The method of claim 16, wherein:
the first and second circuit passages each further comprises two or more turbulators;
two adjacent turbulators in the first circuit passage defining a respective first circuit passage turbulator spacing density;
two adjacent turbulators in the second circuit passage defining a respective second circuit passage turbulator spacing density;
the flow control feature is a difference between first circuit passage turbulator spacing density and the second circuit passage turbulator spacing density;
the first circuit turbulator spacing density is greater than the second circuit turbulator spacing density; and
the first circuit turbulator spacing is configured to restrict flow therethrough, thereby increasing the flow impedance in the first circuit passage.

20. The method of claim 16, wherein:
the first and second circuit passages each further comprise wavy fins;
the wavy fins define wavy fin characteristics of fin amplitude and fin wavelength; and
the flow control feature comprises one or more of:
a difference in fin amplitude, wherein the fin amplitude in the first circuit passage is greater than the fin amplitude in the second circuit passage; and
a difference in fin wavelength, wherein the fin wavelength in the first circuit passage is less than the fin wavelength in the second circuit passage.

* * * * *